(12) United States Patent
Yilmaz et al.

(10) Patent No.: US 11,128,404 B2
(45) Date of Patent: Sep. 21, 2021

(54) METHODS AND APPARATUS FOR PACKET COMMUNICATION OVER A LOCAL NETWORK USING A LOCAL PACKET REPLICATION PROCEDURE

(71) Applicant: Telefonaktiebolaget LM Ericsson (publ), Stockholm (SE)

(72) Inventors: Osman Nuri Can Yilmaz, Espoo (FI); Nicklas Beijar, Kirkkonummi (FI); Jani-Pekka Kainulainen, Kirkkonummi (FI); Ari Keränen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

(21) Appl. No.: 16/478,271

(22) PCT Filed: Mar. 9, 2017

(86) PCT No.: PCT/SE2017/050229
§ 371 (c)(1),
(2) Date: Jul. 16, 2019

(87) PCT Pub. No.: WO2018/164616
PCT Pub. Date: Sep. 13, 2018

(65) Prior Publication Data
US 2021/0014001 A1    Jan. 14, 2021

(51) Int. Cl.
*H04L 1/08* (2006.01)
*H04L 12/741* (2013.01)
(Continued)

(52) U.S. Cl.
CPC ............ *H04L 1/08* (2013.01); *H04L 45/74* (2013.01); *H04W 80/12* (2013.01); *H04W 88/16* (2013.01)

(58) Field of Classification Search
CPC . H04L 1/08; H04L 1/188; H04L 1/189; H04L 45/74; H04W 76/15; H04W 80/02; H04W 80/12; H04W 88/16
See application file for complete search history.

(56) References Cited

U.S. PATENT DOCUMENTS 7,136,356 B2 * 11/2006 Suzuki ................ H04L 12/5601
370/235
7,586,899 B1 * 9/2009 Mohaban .......... H04L 29/06027
370/352
(Continued)

FOREIGN PATENT DOCUMENTS

CA        3045804 A1 * 11/2019 ............ H04L 5/0098
CN     108810990 A  * 11/2018 ............ H04W 76/27
(Continued)

OTHER PUBLICATIONS

Mondal, Amit, et al., "A Case for WiFi Relay: Improving VoIP Quality for WiFi Users", IEEE Communications Society; IEEE ICC 2010, May 23, 2010, pp. 1-5.
(Continued)

*Primary Examiner* — Eric Nowlin
(74) *Attorney, Agent, or Firm* — Murphy, Bilak & Homiller, PLLC

(57) ABSTRACT

A method (100) for performing packet communication over a local network is disclosed, the local network connected to a cellular communication network via a gateway. The method comprises receiving configuration information specifying a condition for application of a local packet replication procedure (102) and determining if the condition is satisfied for a packet to be transmitted over the local network (110). The method further comprises applying the local packet replication procedure to the packet to be transported over the local network if it is determined that the condition is satisfied for the packet (118). The local packet (Continued)

replication procedure comprises generating a copy of the packet for transmission to the packet destination, and the local packet replication procedure is performed by at an application layer protocol. Also disclosed are a method (200) for managing packet communication over a local network, an apparatus (500, 700) for performing packet communication over a local network and a manager (600, 800).

19 Claims, 9 Drawing Sheets

(51) Int. Cl.
*H04W 80/12* (2009.01)
*H04W 88/16* (2009.01)

(56) References Cited

U.S. PATENT DOCUMENTS

| | | | |
|---|---|---|---|
| 9,237,105 B2 | 1/2016 | Huang et al. | |
| 9,331,915 B1* | 5/2016 | Brandwine | H04L 43/04 |
| 9,584,393 B2 | 2/2017 | Kjendal et al. | |
| 9,880,870 B1* | 1/2018 | Danilov | G06F 9/45558 |
| 10,536,878 B2* | 1/2020 | Jheng | H04W 28/04 |
| 10,574,564 B2* | 2/2020 | Loehr | H04L 45/24 |
| 10,623,988 B2* | 4/2020 | Wang | H04W 24/02 |
| 10,638,487 B2* | 4/2020 | Babaei | H04W 72/048 |
| 10,687,248 B2* | 6/2020 | Babaei | H04L 1/1854 |
| 10,694,569 B2* | 6/2020 | Jin | H04L 1/1867 |
| 10,716,094 B2* | 7/2020 | Babaei | H04L 1/1874 |
| 10,736,162 B2* | 8/2020 | Jin | H04L 1/20 |
| 10,805,836 B2* | 10/2020 | Yu | H04W 28/065 |
| 2001/0048662 A1* | 12/2001 | Suzuki | H04L 47/32 370/230 |
| 2009/0080421 A1* | 3/2009 | Ou | H04L 43/026 370/389 |
| 2010/0299447 A1* | 11/2010 | Salvi | G06F 11/2066 709/233 |
| 2012/0063360 A1* | 3/2012 | Muramoto | H04L 45/16 370/254 |
| 2014/0161125 A1* | 6/2014 | Liu | H04L 67/1095 370/390 |
| 2018/0279168 A1* | 9/2018 | Jheng | H04W 28/04 |
| 2018/0279169 A1* | 9/2018 | Wang | H04L 1/08 |
| 2018/0279262 A1* | 9/2018 | Babaei | H04W 72/04 |
| 2018/0309660 A1* | 10/2018 | Loehr | H04L 45/14 |
| 2018/0324642 A1* | 11/2018 | Yu | H04L 1/22 |
| 2018/0368200 A1* | 12/2018 | Jin | H04W 76/15 |
| 2019/0045005 A1* | 2/2019 | Verrall | H04L 67/32 |
| 2019/0098533 A1* | 3/2019 | Babaei | H04W 72/0413 |
| 2019/0191474 A1* | 6/2019 | Jin | H04L 1/20 |
| 2019/0253927 A1* | 8/2019 | Mok | H04L 1/08 |
| 2019/0327641 A1* | 10/2019 | Mok | H04W 4/40 |
| 2019/0349139 A1* | 11/2019 | Park | H04W 76/12 |
| 2019/0394693 A1* | 12/2019 | Kim | H04W 24/08 |
| 2020/0084663 A1* | 3/2020 | Park | H04W 28/06 |
| 2020/0092746 A1* | 3/2020 | Baek | H04W 28/06 |
| 2020/0092944 A1* | 3/2020 | Baek | H04L 1/1848 |
| 2020/0107213 A1* | 4/2020 | Park | H04L 12/1407 |
| 2020/0107392 A1* | 4/2020 | Yl | H04W 76/38 |
| 2020/0163005 A1* | 5/2020 | Rao | H04W 48/16 |
| 2020/0186292 A1* | 6/2020 | Zou | H04L 1/18 |
| 2020/0322860 A1* | 10/2020 | Yan | H04W 80/02 |
| 2020/0344723 A1* | 10/2020 | Babaei | H04L 1/1874 |
| 2020/0367305 A1* | 11/2020 | Jin | H04L 1/1867 |
| 2020/0374752 A1* | 11/2020 | Xiao | H04W 8/02 |
| 2020/0382988 A1* | 12/2020 | Zhao | H04W 28/0278 |

FOREIGN PATENT DOCUMENTS

| | | | | |
|---|---|---|---|---|
| EP | 2843992 A1 | | 3/2015 | |
| EP | 3589067 A1 | * | 1/2020 | H04W 24/08 |
| EP | 3637852 A1 | * | 4/2020 | H04W 36/00 |
| EP | 3641188 A1 | * | 4/2020 | H04L 1/08 |
| EP | 3641188 A4 | * | 6/2020 | H04L 1/08 |
| WO | 2013055034 A1 | | 4/2013 | |
| WO | 2015187067 A1 | | 12/2015 | |
| WO | 2016046629 A1 | | 3/2016 | |
| WO | WO-2018202198 A1 | * | 11/2018 | H04W 76/27 |
| WO | WO-2018230849 A1 | * | 12/2018 | H04W 76/38 |
| WO | WO-2020061769 A1 | * | 4/2020 | H04L 1/08 |

OTHER PUBLICATIONS

"ERC Recommendation 70-03", European Conference of Postal and Telecommunications Administration (CEPT), Feb. 2004, pp. 1-47.
"3GPP TR 23.799 V14.0.0", 3rd Generation Partnership Project; Technical Specification Group Services and System Aspects; Study on Architecture for Next Generation System (Release 14), Dec. 2016, pp. 1-522.
Bormann, C., et al., "Terminology for Constrained-Node Networks", Internet Engineering Task Force (IETF), Request for Comments: 7228, May 2014, pp. 1-17.

* cited by examiner

METHODS AND APPARATUS FOR PACKET COMMUNICATION OVER A LOCAL NETWORK USING A LOCAL PACKET REPLICATION PROCEDURE

TECHNICAL FIELD

The present disclosure relates to methods for performing and managing packet communication over a local network, wherein the local network is connected to a cellular communication network via a gateway. The present disclosure also relates to apparatus for performing and managing packet communication over a local network and to a computer program and a computer program product configured, when run on a computer to carry out methods for performing and managing packet communication over a local network.

BACKGROUND

The "Internet of Things" (IoT) refers to devices enabled for communication network connectivity, so that these devices may be remotely managed, and data collected or required by the devices may be exchanged between individual devices and between devices and application servers. The industrial and commercial applications of IoT are wide ranging and constantly evolving. The rapid expansion of IoT, together with the machine-type communication (MTC) which underpins it, is one of the key aspects which differentiate current and future communication scenarios from those of earlier generation communication networks.

As shown in FIG. 1, the connectivity requirements for IoT are very diverse, and largely depend on the use case of an industrial application to be operated. Different levels of reliability and latency enhancements are therefore needed to service these different requirements. Some Ultra Reliable and Low Latency Communications (URLLC) cases may be less demanding than others from the technical solution perspective.

Many IoT devices may be subject to severe restrictions on processing power, storage capacity, energy supply and/or device complexity, imposed by their operating environment or situation. Consequently, such devices may also be referred to as constrained devices. IoT devices may not connect directly to a cellular communication network, owing to the above mentioned limitations, but rather to a Local Network.

Local Networks may be used to connect IoT devices, for example using Short-Range Radio (SRR), to a gateway device, which gateway device may then use 3GPP radio for backhaul between the gateway and the cellular network. Cellular networks may create added value such as security, ease of deployment, load balancing and end-to-end service agreements for these low-complexity devices. Gateway devices thus provide connectivity between the short-range local network and the cellular network. The gateway device contains software components for registration of the gateway and the IoT devices on the local network, a Local Connectivity Manager for locally managing the connectivity between devices and gateways, and a proxy for relaying and distributing management commands. Gateway devices that participate in a distributed cloud may additionally run Sensor Agents, which are IoT service instances to physical sensors. These sensor agents are controlled by an Instantiator on the gateway device.

As illustrated in FIG. 2, a control function for such local networks may be included in the core network of a cellular network to which a local network is connected. A Local Network Function of this kind may control the registration and authentication of both gateways and IoT devices. The Local Network Function interfaces with the Operations & Support System (OSS) for the 3GPP cellular communication network and enforces management rules and policies based on subscription data. The Local Network Function also orchestrates cloud instances and instantiates software images based on subscriber configuration.

The Constrained Application Protocol (CoAP) is a specialised web transfer protocol for use with constrained nodes such as IoT devices, and constrained (for example low-power or lossy) networks. Nodes using CoAP often have 8-bit microcontrollers with small amounts of ROM and RAM, while constrained networks such as IPv6 over Low-Power Wireless Personal Area Networks (6LoWPANs) often have high packet error rates and a typical throughput of 10 s of kbit/s. CoAP is designed for machine-type communication (MTC) applications such as smart energy and building automation, although it finds application in a wide range of industrial and commercial use cases. CoAP provides a request/response interaction model between application endpoints, supports built-in discovery of services and resources, and includes key concepts of the Web such as URIs and Internet media types. CoAP is designed to interface easily with HTTP for integration with the Internet while meeting specialised requirements such as multicast support, very low overhead, and simplicity for constrained environments.

CoAP has built-in support for re-transmissions to achieve higher reliability in lossy networks. CoAP messages can be marked either as confirmable or non-confirmable. The former type is re-transmitted until an ACK is received from the recipient. The timeout for re-transmissions (default: 2 s) and number of re-transmissions (default: 4) can be adjusted per application usage. CoAP headers contain a message ID field that is used to detect duplicate messages.

CoAP traffic may be secured using transport or IP layer security ((D)TLS or IPsec) or using object security (e.g., OSCOAP). While transport/IP layer security hides all details of the CoAP header from the network, object security can be used to selectively expose some of that information in the network.

Standard methods to ensure reliable communication in IP networks include the use of Quality of Service (QoS) protocols such as RSVP and DiffServ markings. These methods are based on reserving resources in the network for a flow of traffic before traffic is sent and/or marking specific packets in the IP layer that should be given different treatment in the network. Inside the cellular network, bearers are used for QoS. In particular between the UE and the eNodeB, radio bearers separate traffic of different QoS classes.

In Local Networks, some messages, such as sensor switch on/off and measurement or reporting configuration, may be of a higher priority with respect to other messages in terms of latency and reliability. However, there is currently no efficient solution to ensure delivery of higher priority messages over the local network. The local network typically relies on the simple Short Range Radio (SRR) protocol stack in lower layers and connectionless Internet protocols in higher layers, e.g., UDP and CoAP, as the key requirement for local networks is to jointly minimise complexity, latency, and protocol overhead. Furthermore, the traditional retransmission methods by the lower layer radio protocols may not always ensure a reliable recovery mechanism as for example a NACK may be wrongly detected (e.g., as an ACK), not detected or timed-out causing additional delays and slower higher layer transmissions (if available). End-to-end retransmissions may be considered but impose additional delays and are highly inefficient, as all replicated packets are sent over all the links between end points. Some of these links may have limited bandwidth, making retransmission highly costly in terms of resource usage.

SUMMARY

It is an aim of the present disclosure to provide a method, apparatus and computer readable medium which at least partially address one or more of the challenges discussed above.

According to a first aspect of the present disclosure, there is provided a method for performing packet communication over a local network, wherein the local network is connected to a cellular communication network via a gateway. The method comprises receiving configuration information specifying a condition for application of a local packet replication procedure and determining if the condition is satisfied for a packet to be transmitted over the local network. The method further comprises applying the local packet replication procedure to the packet to be transported over the local network if it is determined that the condition is satisfied for the packet. The local packet replication procedure comprises generating a copy of the packet for transmission to the packet destination. The local packet replication procedure is performed at an application layer protocol.

According to examples of the present disclosure, the local network may for example comprise a network formed from Short Range Devices, as defined in the European Conference of Postal and Telecommunications Administrations (CEPT) Electronic Communications Committee (ECC) Recommendation 70-03. According to examples of the present disclosure, the local network may comprise one or more devices satisfying the definition of "constrained node" as set out in section 2.1 of the Internet Engineering Task Force Request for Comments (RFC) 7228, and the local network may itself satisfy the definition of a constrained network set out in the same document.

According to examples of the present disclosure, the method may further comprise generating a plurality of copies of the packet and may further comprise checking for a response indicating that at least one of the copies of the replicated packet has been received by a node in the local network. The method may further comprise ceasing to apply the local packet replication procedure on receipt of such a response.

According to examples of the present disclosure, the application layer protocol at which the local packet replication procedure is performed may be CoAP or HTTP.

According to examples of the present disclosure, the condition may apply only to packets for transmission to a specific device or a group of devices in the local network.

According to examples of the present disclosure, each device in the local network may for example be assigned a profile, and the condition may apply to devices having a specific profile. A plurality of conditions may be received, each condition applicable to devices having a different profile.

According to examples of the present disclosure, the condition may apply only to packets transmitted as part of a specific service provided over the local and cellular communication networks.

According to examples of the present disclosure, the condition may be specific to a slice of the cellular communication network.

According to examples of the present disclosure, a slice of the cellular communication network may conform to the definition of network slice set out in 3GPP TR23.799 v14.0.0. Thus "Network Slice" may comprise a concept describing a system behaviour which is implemented via Network Slice Instance(s), where a Network Slice Instance is an instance created from a Network Slice Template and a Network Slice Template is a logical representation of the Network Function(s) and corresponding resource requirements necessary to provide the required telecommunication services and network capabilities. A Network Function is a 3GPP adopted or 3GPP defined processing function in a network, which has defined functional behaviour and 3GPP defined interfaces. A network function can be implemented either as a network element on a dedicated hardware, or as a software instance running on a dedicated hardware, or as a virtualised function instantiated on an appropriate platform, for example on a cloud infrastructure.

According to examples of the present disclosure, the condition may relate to a characteristic of the packet to be transported over the local network.

According to examples of the present disclosure, the characteristic may comprise at least one of an origin of the packet, a destination of the packet, a network flow of which the packet is a part and/or a priority of the packet.

According to examples of the present disclosure, the origin and destination of the packet may be origin and destination IP addresses and/or may be origin and destination MAC addresses. According to examples of the present disclosure, the condition may relate to a plurality of characteristics, for example specifying an origin and a priority of the packet, or a network flow and a priority of the packet.

According to examples of the present disclosure, a priority of the packet may be determined from at least one of a message type of the packet, a resource URI specified in the packet header, query parameters specified in the packet header, an origin of the packet, a destination of the packet, a Quality of Service Identifier for the packet, a flow identifier for the packet, and/or a network slice within which the packet may be transmitted over the cellular communication network.

According to examples of the present disclosure, in the Downlink (DL) direction, the packet may already have been transmitted over a slice of the cellular communication network before arriving for transmission over the local network, and in the Uplink (UL) direction, the packet may be forwarded onto a slice of the cellular communication network after transmission over the local network. In further examples, the network slice may extend into the local network.

According to examples of the present disclosure, determining if the condition is satisfied for a packet to be transmitted over the local network may comprise at least one of inspecting an application layer header of the packet, and/or inspecting DiffServ code points for the packet.

According to examples of the present disclosure, if determining if the condition is satisfied for a packet to be transmitted over the local network comprises inspecting an application layer header of the packet, and if at least one of transport security or IP layer security is applied to the packet, determining if the condition is satisfied for the packet may further comprise terminating the secure connection for the packet before performing application layer header inspection.

According to examples of the present disclosure, the node conducting the method may for example operate as a proxy, enabling the node to terminate the secure connection and perform header inspection in order to determine if the condition is satisfied, and hence if local packet replication should be performed.

According to examples of the present disclosure, the method may further comprise checking for an override condition and, if the override condition is satisfied, ceasing to apply the local packet replication procedure to the packet.

According to examples of the present disclosure, the override condition may be received as part of the configuration information specifying the condition for application of the local packet replication procedure. According to some examples of the present disclosure, the check for an override condition may be performed before the local packet replication procedure is applied, such that if the override condition is satisfied, the local packet replication procedure may not be applied to a packet, even if the condition for its application is satisfied for that packet.

According to examples of the present disclosure, the override condition may comprise at least one of a threshold load condition in a node performing the method, a threshold load condition in the cellular communication network, a threshold power condition in a node performing the method, a threshold radio interface quality in the local network.

According to examples of the present disclosure, the configuration information specifying the condition for application of the local packet replication procedure and the override condition may additionally specify a hierarchy of interaction between the one or more characteristics specified in the condition and the one or more override conditions. The hierarchy of interaction may be such that certain conditions for application of local packet replication may always be overridden when an override condition is satisfied, ceasing local packet replication for packets satisfying those conditions, while local packet replication of packets satisfying other conditions may be maintained, even when override conditions are satisfied. In this manner, the highest priority packets may always be replicated, even when local or global conditions render this replication extremely costly from the point of view of network performance, node power management etc.

According to examples of the present disclosure, the method may further comprise receiving configuration information specifying at least one of rate of replication parameters to be applied for the local packet replication procedure and/or a condition for establishing rate of replication parameters to be applied for the local packet replication procedure.

According to examples of the present disclosure, the rate of replication parameters and/or condition may apply to packets for transmission to a specific device or a group of devices in the local network, to packets transmitted as part of a specific service provided over the local and cellular communication networks or may be specific to a slice of the cellular communication network.

According to examples of the present disclosure, the rate of replication parameters may comprise a number of copies of the packet to be included in a burst and/or a number of bursts to be transmitted and/or a timing interval between bursts.

According to examples of the present disclosure, the condition for establishing rate of replication parameters to be applied for the local packet replication procedure may comprise at least one of a Service Level Agreement which applies to the packet, a priority of the packet, a radio interface quality in the local network, a load condition in a node performing the method, a load condition in the cellular communication network, and/or a power condition in a node performing the method.

According to examples of the present disclosure, the configuration information may specify interaction between for example the one or more conditions for establishing rate of replication parameters and the condition for applying the local packet replication procedure. The condition for establishing rate of replication parameters may thus be adjusted according to a characteristic of the packet as evaluated according to the condition for applying local packet replication. In this manner, for example, the highest priority packets may always be replicated with high rate of replication parameters (many copies per burst, many bursts, short intervals between bursts), while the replication rate parameters for lower priority packets may be adjusted to accommodate local load or radio interface conditions.

According to examples of the present disclosure, the method may further comprise deactivating a lower layer concatenation feature before applying the local packet replication procedure to the packet to be transported over the local network.

According to examples of the present disclosure, the method may further comprise receiving configuration information specifying a time limit for application of the local packet replication procedure, and ceasing application of the local packet replication procedure on expiry of the time limit.

According to examples of the present disclosure, the method may further comprise, during application of the local packet replication procedure, adjusting a rate of replication parameter as a function of time remaining until expiry of the time limit.

According to examples of the present disclosure, the method may for example comprise increasing the number of copies per burst or reducing the interval between bursts as the time limit approaches, in an effort to ensure the packet is delivered before the time limit expires.

According to examples of the present disclosure, the method may be performed by the gateway connecting the local network to the cellular communication network, and the configuration information may be received from an application configured for control of the local network.

According to examples of the present disclosure, the application may be hosted within the cellular communication network.

According to examples of the present disclosure, the application may be hosted within the core network of the cellular communication network, and may for example be configured to register the gateway and the devices in the local network on the cellular communication network.

According to examples of the present disclosure, the method may be performed by a device in the local network, and the configuration information may be received from the gateway connecting the local network to the cellular communication network.

According to examples of the present disclosure, the local packet replication procedure may be transparent to nodes communicating with devices in the local network via the cellular communication network.

According to another aspect of the present disclosure, there is provided a method for managing packet communication over a local network, wherein the local network is connected to a cellular communication network via a gateway. The method comprises sending, to at least one of the gateway or a device on the local network, configuration information specifying a condition for application of a local packet replication procedure by the gateway or a device on the local network. The local packet replication procedure comprises generating a copy of the packet for transmission to the packet destination. The local packet replication procedure is performed at an application layer protocol.

According to examples of the present disclosure, the condition may apply to packets for transmission to a specific device or a group of devices in the local network.

According to examples of the present disclosure, each device in the local network may for example be assigned a profile, and the condition may apply to devices having a specific profile. A plurality of conditions may be received, each condition applicable to devices having a different profile.

According to examples of the present disclosure, the condition may apply to packets transmitted as part of a specific service provided over the local and cellular communication networks.

According to examples of the present disclosure, the condition may be specific to a slice of the cellular communication network.

According to examples of the present disclosure, the condition may relate to a characteristic of the packet to be transported over the local network.

According to examples of the present disclosure, the characteristic may comprise at least one of an origin of the packet, a destination of the packet, a network flow of which the packet is a part and/or a priority of the packet.

According to examples of the present disclosure, the origin and destination of the packet may be origin and destination IP addresses and/or may be origin and destination MAC addresses. According to examples of the present disclosure, the condition may relate to a plurality of characteristics, for example specifying an origin and a priority of the packet, or a network flow and a priority of the packet.

According to examples of the present disclosure, a priority of the packet may be determined from at least one of a message type of the packet, a resource URI specified in the packet header, query parameters specified in the packet header, an origin of the packet, a destination of the packet, a Quality of Service Identifier for the packet, a flow identifier for the packet and/or a network slice within which the packet may be transmitted over the cellular communication network.

According to examples of the present disclosure, in the DL direction, the packet may already have been transmitted over a slice of the cellular communication network before arriving for transmission over the local network. In the UL direction, the packet may be forwarded onto a slice of the cellular communication network after transmission over the local network. In further examples, the network slice may extend into the local network.

According to examples of the present disclosure, the configuration information may further specify an override condition for ceasing application of the local packet replication procedure.

According to examples of the present disclosure, the configuration information specifying the condition for application of the local packet replication procedure and the override condition may additionally specify a hierarchy of interaction between the one or more characteristics specified in the condition for application of the local packet replication procedure and the one or more override conditions. The hierarchy of interaction may be such that certain conditions for application of the local packet replication procedure may always be overridden when an override condition is satisfied, ceasing local packet replication for packets satisfying those conditions, while local packet replication of packets satisfying other conditions for application of the local packet replication procedure may be maintained, even when override conditions are satisfied. In this manner, the highest priority packets may always be replicated, even when local or global conditions render this replication extremely costly from the point of view of network performance, node power management etc.

According to examples of the present disclosure, the method may further comprise sending, to the at least one of the gateway or a device on the local network, configuration information specifying at least one of rate of replication parameters to be applied for the local packet replication procedure and/or a condition for establishing rate of replication parameters to be applied for the local packet replication procedure.

According to examples of the present disclosure, the rate of replication parameters and/or condition may apply to packets for transmission to a specific device or a group of devices in the local network, to packets transmitted as part of a specific service provided over the local and cellular communication networks or may be specific to a slice of the cellular communication network.

According to examples of the present disclosure, the rate of replication parameters may comprise a number of copies of the packet to be included in a burst and/or a number of bursts to be transmitted and/or a timing interval between bursts.

According to examples of the present disclosure, the condition for establishing rate of replication parameters to be applied for the local packet replication procedure may comprise at least one of a Service Level Agreement which applies to the packet, a priority of the packet, a radio interface quality in the local network, a load condition in a node performing the method, a load condition in the cellular communication network, and/or a power condition in a node performing the method.

According to examples of the present disclosure, the configuration information may specify interaction between for example the one or more conditions for establishing rate of replication parameters and the condition for applying the local packet replication procedure. The condition for establishing rate of replication parameters may thus be adjusted according to a characteristic of the packet as evaluated according to the condition for applying local packet replication. In this manner, for example, the highest priority packets may always be replicated with high rate of replication parameters (many copies per burst, many bursts, short intervals between bursts), while the replication rate parameters for lower priority packets may be adjusted to accommodate local load or radio interface conditions.

According to examples of the present disclosure, the method may further comprise sending, to the at least one of the gateway or a device on the local network, configuration information specifying a time limit for application of the local packet replication procedure.

According to examples of the present disclosure, the method may be performed by an application configured for control of the local network.

According to examples of the present disclosure, the application may be hosted within the cellular communication network.

According to examples of the present disclosure, the application may be hosted within the core network of the cellular communication network, and may for example be configured to register the gateway and the devices in the local network on the cellular communication network.

According to examples of the present disclosure, the local network may be connected to the cellular communication network via a plurality of gateways, and the method may further comprise determining that a device in the local network is in a mobile state, and causing at least some packets having that device as packet destination to be transmitted via a at least two of the gateways connecting the local network to the cellular communication network.

According to examples of the present disclosure, the gateways may be selected according to a trajectory of the moving device, so as to increase the probability of the packets being successfully delivered to the device. According to examples of the present disclosure, the method may further comprise causing the local packet replication procedure to be applied for the packets by the at least two gateways via which the packets are transmitted.

According to examples of the present disclosure, the local network may be connected to the cellular communication network via a plurality of gateways, and the method may further comprise selecting a first set of rate of replication parameters to be applied for the local packet replication procedure performed at a first of the gateways, selecting a second set of rate of replication parameters to be applied for the local packet replication procedure performed at a second of the gateways, sending the first set of rate of replication parameters to the first gateway, and sending the second set of rate of replication parameters to the second gateway. The first and second set of rate of replication parameters may be selected to minimise interference in the local area network.

According to examples of the present disclosure, the method may thus allow a controlling application to adjust burst length and timing in different gateways so as to minimise interference and prioritise the sending of the highest priority packets, ensuring that no other gateway is transmitting while a particular gateway is transmitting a burst of replicated very high priority packets.

According to examples of the present disclosure, the method may be performed by the gateway connecting the local network to the cellular communication network.

According to another aspect of the present disclosure, there is provided a method for performing packet communication over a local network, wherein the local network is connected to a cellular communication network via a gateway. The method comprises receiving at least two copies of a packet over the local network and performing a soft combination of the received packet copies. In some examples of the present disclosure, performing a soft combination of the packet copies may comprise applying a Forward Error Correction technique.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided an apparatus for performing packet communication over a local network, wherein the local network is connected to a cellular communication network via a gateway. The apparatus comprises a processor and a memory, the memory containing instructions executable by the processor such that the apparatus is operable to receive configuration information specifying a condition for application of a local packet replication procedure, determine if the condition is satisfied for a packet to be transmitted over the local network, and apply the local packet replication procedure to the packet to be transported over the local network if it is determined that the condition is satisfied for the packet. The local packet replication procedure comprises generating a copy of the packet for transmission to the packet destination. The local packet replication procedure is performed at an application layer protocol.

According to another aspect of the present disclosure, there is provided an apparatus for performing packet communication over a local network, wherein the local network is connected to a cellular communication network via a gateway. The apparatus is adapted to receive configuration information specifying a condition for application of a local packet replication procedure, determine if the condition is satisfied for a packet to be transmitted over the local network, and apply the local packet replication procedure to the packet to be transported over the local network if it is determined that the condition is satisfied for the packet. The local packet replication procedure comprises generating a copy of the packet for transmission to the packet destination. The local packet replication procedure is performed at an application layer protocol.

According to another aspect of the present disclosure, there is provided an apparatus for performing packet communication over a local network, wherein the local network is connected to a cellular communication network via a gateway. The apparatus comprises a receiving module for receiving configuration information specifying a condition for application of a local packet replication procedure, a processing module for determining if the condition is satisfied for a packet to be transmitted over the local network, and a replication module for applying the local packet replication procedure to the packet to be transported over the local network if it is determined that the condition is satisfied for the packet. The local packet replication procedure comprises generating a copy of the packet for transmission to the packet destination. The local packet replication procedure is performed at an application layer protocol.

According to examples of the present disclosure, the apparatus of the preceding aspects of the present disclosure may comprise or be comprised within a gateway connecting the local network to the cellular communication network, or a device in the local network.

According to another aspect of the present disclosure, there is provided a manager for managing packet communication over a local network, wherein the local network is connected to a cellular communication network via a gateway. The manager comprises a processor and a memory, the memory containing instructions executable by the processor such that the manager is operable to send, to at least one of the gateway or a device on the local network, configuration information specifying a condition for application of a local packet replication procedure by the gateway or a device on the local network. The local packet replication procedure comprises generating a copy of the packet for transmission to the packet destination. The local packet replication procedure is performed at an application layer protocol.

According to another aspect of the present disclosure, there is provided a manager for managing packet communication over a local network, wherein the local network is connected to a cellular communication network via a gateway. The manager is adapted to send, to at least one of the gateway or a device on the local network, configuration information specifying a condition for application of a local packet replication procedure by the gateway or a device on the local network. The local packet replication procedure comprises generating a copy of the packet for transmission to the packet destination. The local packet replication procedure is performed at an application layer protocol.

According to another aspect of the present disclosure, there is provided a manager for managing packet communication over a local network, wherein the local network is connected to a cellular communication network via a gateway. The manager comprises a transmission module for sending, to at least one of the gateway or a device on the local network, configuration information specifying a condition for application of a local packet replication procedure by the gateway or a device on the local network. The local packet replication procedure comprises generating a copy of the packet for transmission to the packet destination. The local packet replication procedure is performed at an application layer protocol.

According to examples of the present disclosure, the manager of the preceding aspects of the present disclosure may be a gateway connecting the local network to the cellular communication network or may be an application configured for control of the local network. The manager may be a single element or may be part of a distributed management function, which may for example be a Virtualized Network Function. In the case of an application configured for control of the local network, the application may be hosted within the cellular communication network, for example within the core network of the cellular communication network, and may be configured to register the gateway and the devices in the local network on the cellular communication network.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide methods for performing and managing packet communication over a local network according to which a local packet replication procedure may be conducted for a particular packet to be transported over the local network, if a condition for application of the local packet replication procedure is satisfied by the packet. By performing the packet replication procedure over the local network, the delays and resource wastage inherent in end to end packet replication are avoided, and through appropriate configuration of the condition for application of the local packet replication procedure, packet replication may be targeted to those packets for which higher reliability is required, so providing the required higher reliability without the trade-off of increased latency or resource wastage.

The methods for performing and managing packet communication over a local network set out in the present disclosure may be applied in the Downlink (DL) or Uplink (UL). In a DL scenario, a packet may be received by a gateway device for transmission to a device on a local network. The gateway device may be managed by a manager, for example a local network function housed within a cellular communication network to which the local network is connected via the gateway device. In an UL scenario, a device on the local network may have a packet for transmission via the gateway to a destination node within the cellular communication network. The device may be managed by an appropriate gateway device connecting the local network to the cellular communication network, and/or may be managed by a local network function housed within the cellular communication network.

In some examples of the present disclosure, communication between the gateway device and devices on the local network is based on Short Range Radio (SRR) protocols in lower layers, and the protocol stack of IP, UDP (for latency and overhead gain) and an application layer protocol such as CoAP in the higher layers. An example SRR technologies is IEEE 802.11ah. Communication between the gateway device and the cellular communication network may be based on the specified 3GPP protocol stack in the lower layers. In some examples, the manager, such as a local network function, may be a part of a centralised Machine to Machine (M2M)/IoT cloud. In other examples, the manager may be a distributed function separate from the M2M/IoT cloud. In either case, the manager may directly or indirectly communicate with and/or control/configure both gateway devices and devices in one or more local networks.

Figure 1:
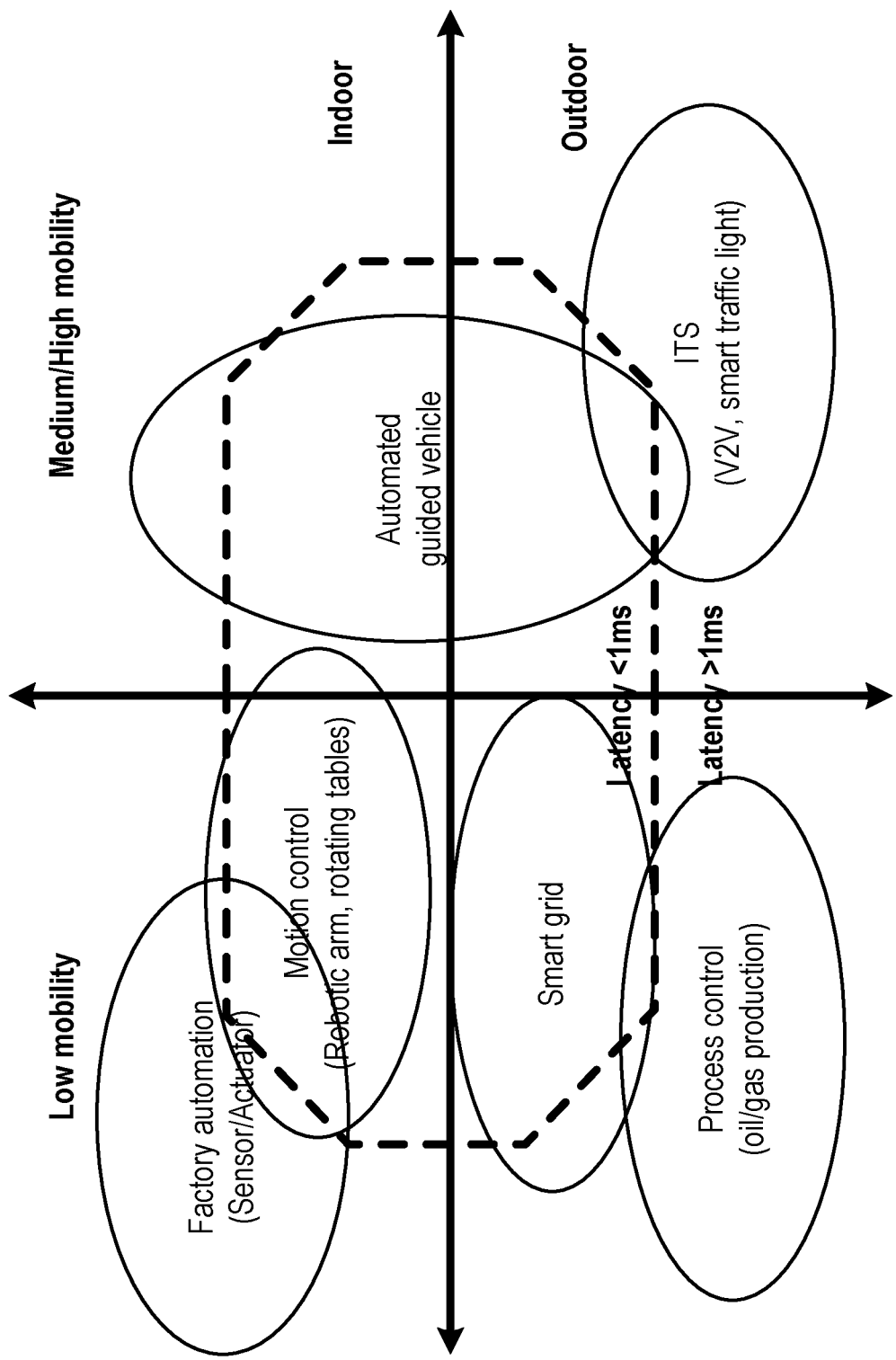
FIG. 1 illustrates attributes and requirements of industrial IoT use cases.
Figure 2:
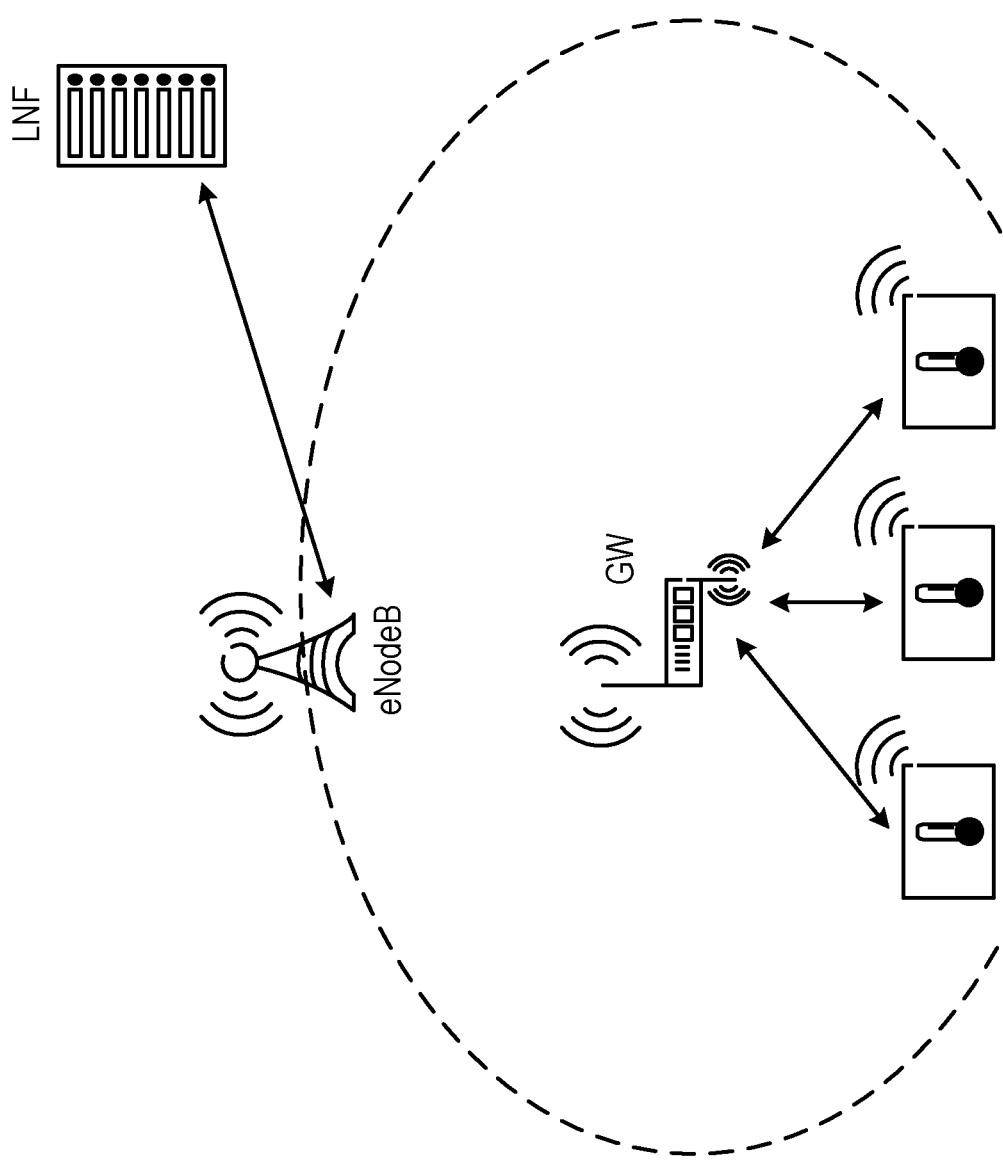
FIG. 2 illustrates a Local Network connected to a cellular communication network via a gateway.
Figure 3A:
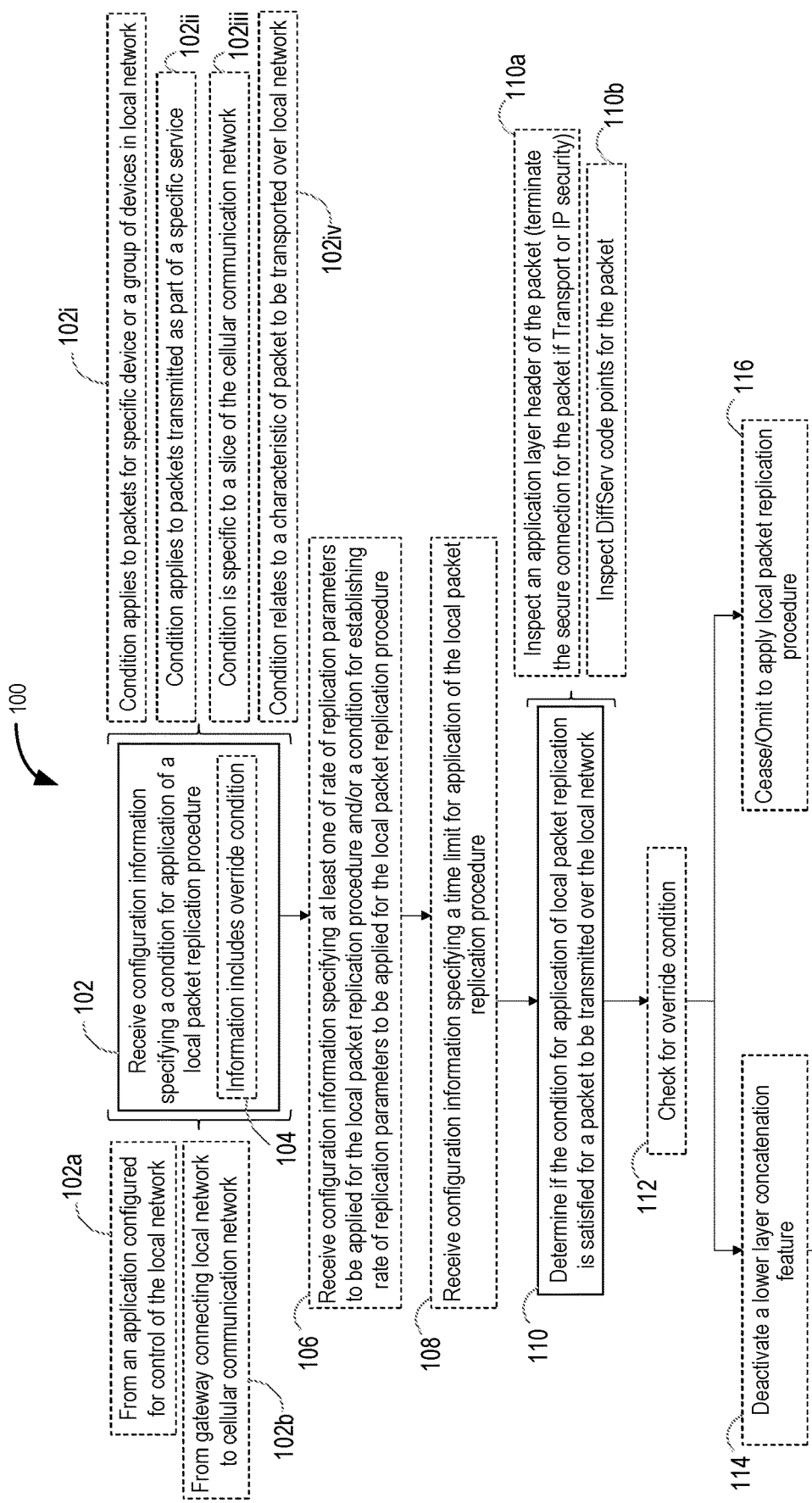
FIGS. 3a and 3b are flow charts illustrating process steps in a method for performing packet communication over a local network.
Figure 3B:
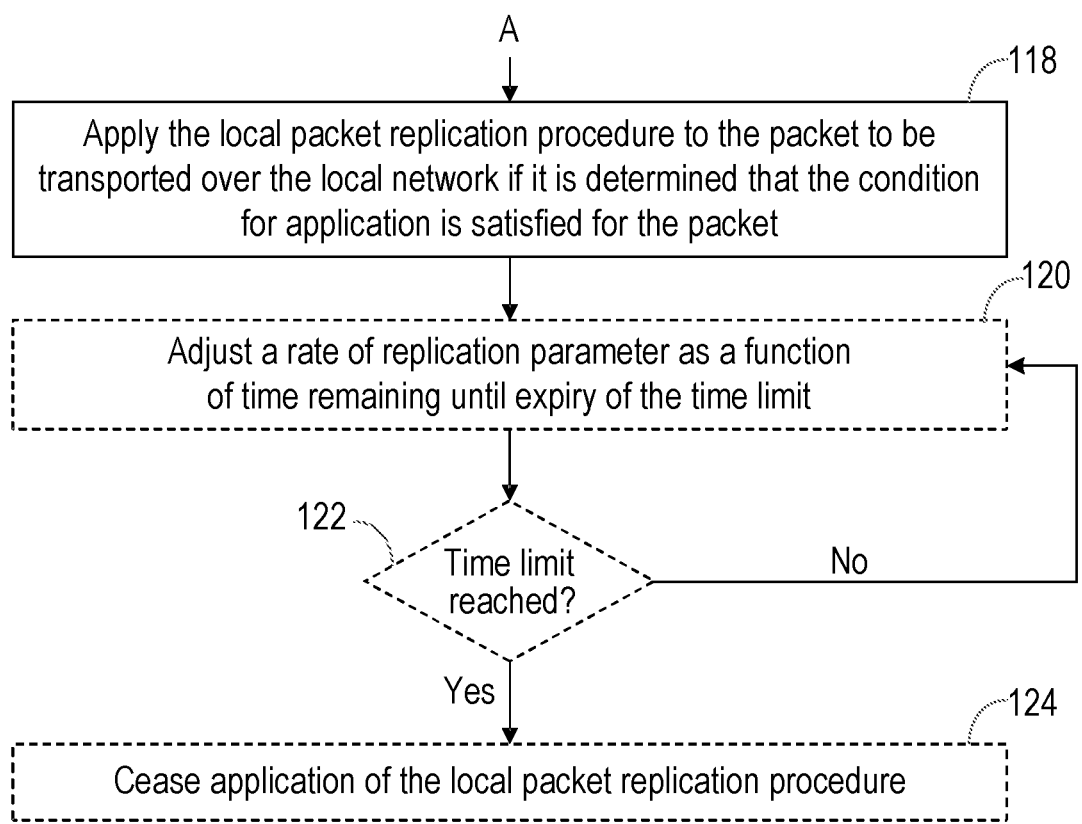

FIGS. 3a and 3b illustrate process steps in a method 100 for performing packet communication over a local network, wherein the local network is connected to a cellular communication network via a gateway. The method 100 of FIGS. 3a and 3b may be conducted by the gateway or by a device within the local network, as discussed in further detail below.

Referring to FIG. 3a, in a first step 102, the method 100 comprises receiving configuration information specifying a condition for application of a local packet replication procedure. As illustrated in step 104, the configuration information may also include an override condition, as is discussed in further detail below. Depending upon the entity conducting the method 100, the configuration information may be received from an application configured to control the local network, for example a Local Network Function located within the cellular communication network, as illustrated in 102a, or may be received from the gateway connecting the local network to the cellular communication network. The condition for application of the local packet replication procedure may vary considerably depending upon the particular use case in which the method 100 is implemented. In certain use cases, it may be desirable to limit the application of the condition only to certain packets. Thus, in one example as shown in 102i, the condition may apply only to packets destined for a specific device or group of devices in the local network. This may be particularly appropriate in a DL scenario, when the method is applied by the gateway connecting the local network to the cellular communication network. In such an example, the gateway may first check whether a packet is destined for a particular device or one of a particular group of devices in the local network, and if the packet is so destined, may then check whether the condition is satisfied for the packet, If the packet is not destined for one of the specified devices, then the gateway may ignore the condition for that packet, and simply forward the packet to its destination without consideration of whether the local packet replication procedure should be applied or not. In some examples, each device in the local network may be assigned a profile, and the condition may apply to devices having a specific profile.

In another example, as shown in 102ii, the condition may apply only to packets transmitted as part of a certain service. This may apply in both an UL and DL scenario, in which the entity performing the method, either a device or the gateway, first determines a service to which the packet relates, and then checks whether the received condition should be applied to packets for that service. If the condition does apply to packets for that service, then the device or gateway may then determine whether or not the condition is satisfied for the packet and act accordingly, if the condition does not apply to that service, then the device or gateway may simply forward the packet onto the local network as normal.

In another example, as shown in 102iii, the condition may be specific to a slice of the cellular communication network, and may thus only be applied to packets which have been transmitted over that slice in the cellular communication network (in the DL direction), or which are destined to be transmitted over that slice (in the UL direction). In some examples the network slice may extend to the gateway device, in which case receipt of the condition by the gateway may indicate that the condition is applicable to all packets in the slice of which the gateway is a part. In still further examples, the network slice may extend fully into the local network. In other examples, the gateway device may receive packets from a plurality of network slices, and may thus apply the condition for local packet replication only to packets received from a particular slice of the cellular communication network. The network slice may be identified by a slice ID.

In some examples, a plurality of different conditions may be received in the configuration information at step 102, each condition applying to a different device profile, a different service, a different network slice, etc. The entity performing the method 100 may select an appropriate condition for determining whether the local packet replication procedure should be applied to a particular packet for transmission of the local network on the basis of the profile of a destination device, a service to which the packet relates, a network slice over which the packet has been/is to be transmitted etc.

In some examples of the method 100, as shown in 102iv, the condition may relate to a characteristic of a packet to be transported over the local network. Determining whether the condition is satisfied for the packet may thus comprise examining an appropriate characteristic of the packet. In some examples, the condition may relate to a plurality of characteristics, such that an example condition may be that the local packet replication procedure should be applied to packets having characteristic X and characteristic Y and characteristic Z.

The characteristic or characteristics specified in the condition may for example comprise at least one of an origin of the packet, a destination of the packet, a network flow of which the packet is a part and/or a priority of the packet. The origin and destination of the packet may be origin and destination IP addresses and/or may be origin and destination MAC addresses. Referring to the above example of a condition specifying multiple characteristics, an example condition may thus specify that the local packet replication procedure should be applied to packets having an origin X and a priority Y, or to packets that are part of a network flow W and have a priority Z, etc.

In some examples of the method 100, a priority of a packet may be determined from at least one of a message type of the packet, a resource URI specified in the packet header, query parameters specified in the packet header, an origin of the packet, a destination of the packet, a Quality of Service Identifier for the packet, a flow identifier for the packet, and/or a network slice within which the packet may be transmitted over the cellular communication network. This is discussed in further detail below, with reference to step 110. Examples of high priority packets may include sensor switch on/switch off commands, measurement configuration messages and/or reporting configuration messages.

In step 106, the method 100 may comprise receiving configuration information specifying at least one of rate of replication parameters to be applied for the local packet replication procedure and/or a condition for establishing rate of replication parameters to be applied for the local packet replication procedure. The configuration information may be received from the same entity as the configuration information specifying the condition for application of the local packet replication procedure. As discussed in further detail below, the local packet replication procedure may comprise generating one or more copies of the relevant packet and sending the copy, or several of the copies, in one or more bursts, the bursts separated over intervals. The rate of replication parameters may thus comprise for example a number of copies of the packet to be generated, a number of copies of the packet to be included in a burst and/or a number of bursts to be transmitted and/or a timing interval between bursts.

As for the condition for application of the local packet replication procedure, the rate of replication parameters and/or condition for establishing rate of replication parameters may apply to packets for transmission to a specific device or a group of devices in the local network, to packets transmitted as part of a specific service provided over the local and cellular communication networks or may be specific to a slice of the cellular communication network.

In some examples of the method 100, the condition for establishing rate of replication parameters to be applied for the local packet replication procedure may comprise at least one of a Service Level Agreement (SLA) which applies to the packet, a priority of the packet, a radio interface quality in the local network, a load condition in a node performing the method, a load condition in the cellular communication network, and/or a power condition in a node performing the method. Thus, in some examples, the local packet replication procedure when applied to a packet subject to a particular SLA may be applied with different rate of replication parameters than when applied to a packet subject to a different SLA. Packets subject to SLAs guaranteeing a very high degree of reliability may thus be replicated with many copies generated, many copies per burst and/or short intervals between bursts, whereas packets subject to an SLA with less stringent reliability requirements may still be subject to the local packet replication procedure, but that procedure may be modified to use less resource, for example by sending fewer copies per burst or by extending the intervals between bursts. The SLA may be established between the providers of the local network domain and the cellular connectivity domain or between a service owner and the connectivity domain provider.

In further examples, the rate of replication parameters may be adjusted according to local conditions, such as radio interface quality in the local network, retransmission rate, load or power conditions of entities in the local network or cellular communication network. In a DL scenario, the gateway may detect the reliability characteristics of the local network, including for example whether or not replication is already used in lower layers and how much interference there is, and keep track of previous communication success. This information can be used to adjust the rate of replication parameters. In this manner, when radio interface quality is poor, rate of replication parameters may be adjusted to increase the number of copies sent, accounting for the increased likelihood of lost packets owing to the poor interface quality. In further examples, if the entity performing the method is subject to a high processing load or is low on power, the rate of replication parameters may be adjusted to reduce the number of copies per burst or extend intervals between bursts, so as to provide increased efficiency of resource usage compared to parameters for when local conditions are optimal. In further examples, replication rate parameters may be associated to packet priority in terms of reliability/QoS. In such examples, either the entity sending the configuration information or the entity performing the method 100 may establish the appropriate rate of replication parameters.

In some examples of the method 100, the configuration information specifying the rate of replication parameters and or condition for establishing the rate of replication parameters may also specify an interaction between for example the one or more conditions for establishing rate of replication parameters and the condition for applying the local packet replication procedure. The condition for establishing rate of replication parameters may thus be adjusted according to a characteristic of the packet as evaluated according to the condition for applying local packet replication. In this manner, for example, the highest priority packets may always be replicated with high rate of replication parameters (many copies per burst, many bursts, short intervals between bursts), while the replication rate parameters for lower priority packets may be adjusted to accommodate local load or radio interface conditions.

The method 100 may further comprise, in step 108, receiving configuration information specifying a time limit for application of the local packet replication procedure. The configuration information may be received from the same entity as the configuration information specifying the condition for application of the local packet replication procedure.

The method 100 further comprises, in step 110, determining if the condition for application of local packet replication is satisfied for a packet to be transmitted over the local network. As discussed above, in some examples, the entity performing the method 100 may first determine if the condition, or any one of a plurality of received conditions, applies to the particular packet (on the basis of packet profile, destination, service, network slice etc.). Having selected an appropriate condition for the packet, the entity may then determine whether or not that condition is satisfied for the packet. As illustrated at 110a and 110b, determining if the condition is satisfied for a packet to be transmitted over the local network may comprise at least one of inspecting an application layer header of the packet, and/or inspecting DiffServ code points for the packet.

Inspecting an application layer header or DiffServ code points for the packet may enable the entity conducting the method to establish characteristics of the packet and so establish whether or not the condition for application of the local packet replication procedure is satisfied. For example, in the case of a condition specifying a priority of the packet, an application layer header such as a CoAP header may contain information enabling the entity conducting the method to establish the priority of the packet. If a CoAP message header contains the "confirmable" flag it means the sender expects acknowledgement for the message and may thus indicate a higher priority message. In some examples, the resource URI and query parameters from CoAP headers may also be used to determine the priority if their semantics are understood. For example, a resource named "alarm" could get higher priority than a resource named "temperature", or a resource with "actuator" interface type could be treated with higher priority than a resource with "sensor" type interface. Other alternative or additional methods for inferring priority include source and destination transport and IP address, QoS identifiers and flow identifiers. In case network slicing is extended to the gateway, the different slices can be associated to different priorities.

For examples of the method in which the condition for application of the local packet replication procedure includes multiple characteristics, each of these characteristics may be established via inspection of application layer headers or DiffServ code points, such that for example a condition specifying both destination and priority may be evaluated for the packet being processed.

In examples in which determining if the condition for application of the local packet replication procedure is satisfied for a packet to be transmitted over the local network comprises inspecting an application layer header of the packet, and if at least one of transport security or IP layer security is applied to the packet, determining if the condition is satisfied for the packet may further comprise terminating the secure connection for the packet before performing application layer header inspection. In the example of a gateway conducting the method 100, the gateway may for example operate as a proxy, enabling the gateway to terminate the secure connection and perform header inspection in order to determine if the condition is satisfied, and hence if local packet replication should be performed. With object security the endpoints can choose to expose relevant information such that appropriate header inspection may be performed.

In step 312, the method 100 may comprise checking for an override condition, which override condition may have been received at step 102 in configuration information with the condition for applying local packet replication. If the override condition is satisfied, the method 100 may comprise ceasing to apply the local packet replication procedure to the packet or not starting to apply the local packet replication procedure to the packet, at step 116.

In some examples of the method 100, the override condition may comprise at least one of a threshold load condition in a node performing the method, a threshold load condition in the cellular communication network, a threshold power condition in a node performing the method, and/or a threshold radio interface quality in the local network. The override condition may thus have the effect of causing the local packet replication procedure to be ceased, or not applied, in the event that conditions, either in the local network, the cellular communication network, or the entity performing the method, mean applying the local packet replication procedure would be unacceptably costly from the point of view of radio resource, processing or power resource etc.

In some examples of the method 100, the configuration information specifying the condition for application of the local packet replication procedure and the override condition may additionally specify a hierarchy of interaction between the one or more characteristics specified in the condition for application of the local packet replication procedure and the one or more override conditions. The hierarchy of interaction may be such that certain conditions for application of local packet replication may always be overridden when an override condition is satisfied, ceasing local packet replication for packets satisfying those conditions, while local packet replication of packets satisfying other conditions may be maintained, even when override conditions are satisfied. In this manner, the highest priority packets may always be replicated, even when local or global conditions render this replication extremely costly from the point of view of network performance, node power management etc.

If the override condition is not satisfied, or if a specified hierarchy of conditions indicates that packet replication should be performed regardless of the override condition, the method 100 may further comprise, at step 114, deactivating a lower layer concatenation feature, if such a feature exists. This feature may be deactivated only partially or temporarily, so as to ensure that replicated packets are sent within different physical transmission instances.

Referring now to FIG. 3b, in step 118, the method 100 comprises applying the local packet replication procedure to the packet to be transported over the local network if it is determined that the condition for application of the local packet replication procedure is satisfied for the packet. As discussed above, this may comprise generating one or more copies of the packet and forwarding these copies to lower layers for transmission to the packet destination. The copies may be transmitted in one or more bursts which may be separated by intervals. The local packet replication procedure is performed at an application layer protocol such as CoAP. The local packet replication procedure is thus distinguished from packet replication procedures conducted at radio level protocols, and which are performed purely on the basis of current radio conditions. The local packet replication procedure, as explained above, is applied or not on the basis of a condition which is considered for each packet to be transmitted rather than on the basis of local or global radio link quality, and which condition may specify one or more packet characteristics. Such a replication procedure is thus performed in an application layer protocol, rather than in a lower layer of the protocol stack.

In step 120, the method 100 may further comprise adjusting a rate of replication parameter for the local packet replication procedure as a function of time remaining until expiry of the time limit, if such a limit was received in step 108. Step 120 may for example comprise increasing the number of copies per burst or reducing the interval between bursts as the time limit approaches, in an effort to ensure the packet is delivered before the time limit expires.

The method 100 may further comprise, in step 122, checking whether the time limit has been reached, and, if the time limit has been reached, ceasing application of the local packet replica procedure in step 124. Alternatively or in addition to the use of a time limit for application of the local packet replication procedure, some examples of the method 100 may further comprise checking for a response indicating that at least one of the copies of the replicated packet has been received by a node in the local network. The method may further comprise ceasing to apply the local packet replication procedure on receipt of such a response.

As discussed above, the method 100 may be performed by a device in the local network, for example in an UL scenario, and/or may be performed by the gateway, for example in a DL scenario. The device may receive configuration information from the gateway and/or from an application for control of the local network. In the case of a device receiving configuration information from a gateway, that information may be transmitted by the gateway under control of the application for control of the local network. The gateway may receive configuration information from the application for control of the local network, which may for example be hosted in a core network of the cellular communication network. The gateway may in some examples be considered as an LTE/NR UE in the cellular communication network domain.

Figure 4:
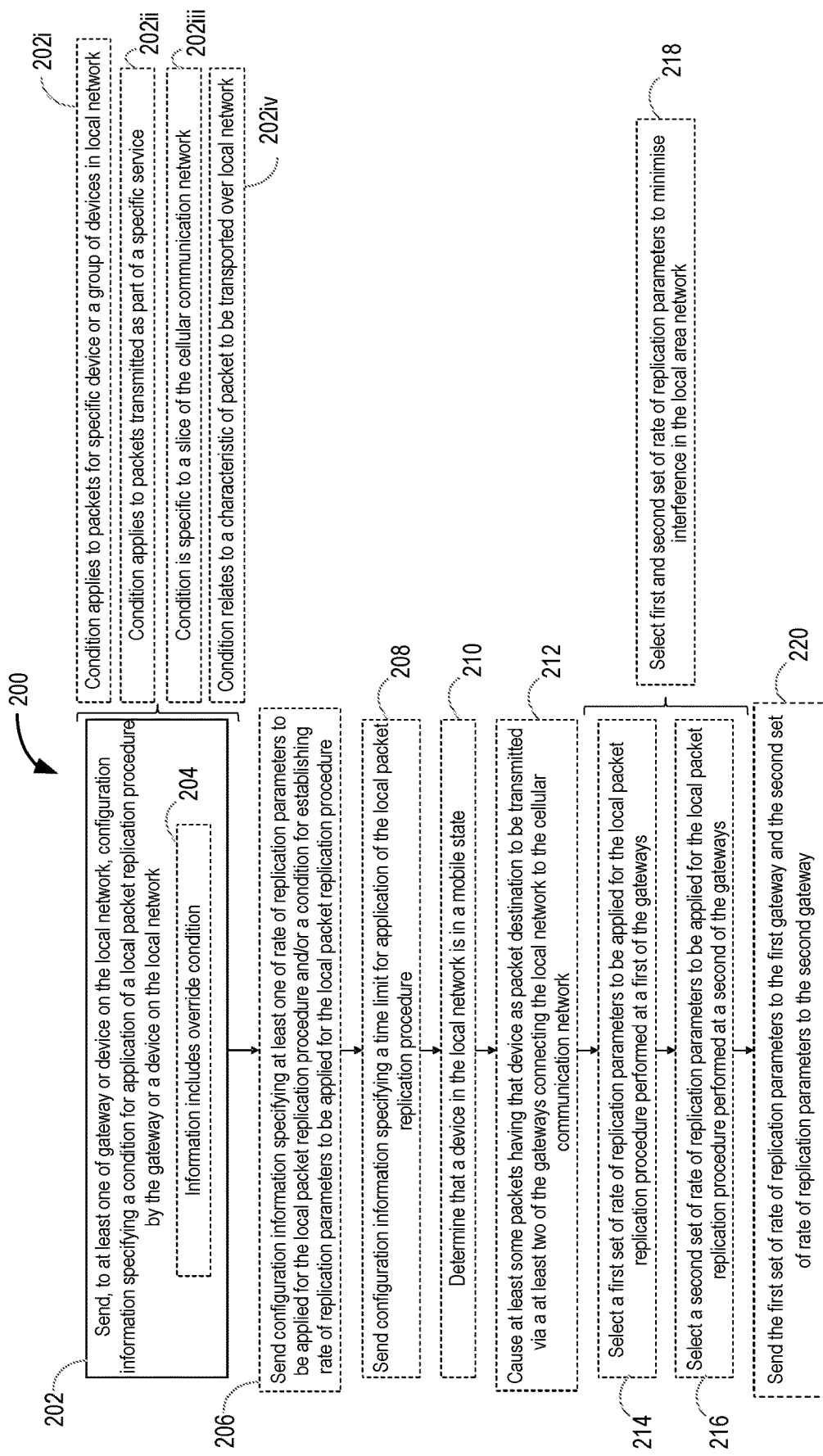
FIG. 4 is a flow chart illustrating process steps in a method for managing packet communication over a local network.

FIG. 4 illustrates process steps in a method 200 for managing packet communication over a local network, which method may be conducted by a gateway and/or by an application for control of the local network. The method 200 may compliment the method 100 to achieve some or all of the above discussed functionality.

Referring to FIG. 4, in a first step 202, the method 200 comprises sending, to at least one of the gateway connecting the local network to the cellular communication network or a device on the local network, configuration information specifying a condition for application of a local packet replication procedure by the gateway of device.

As illustrated at 202*i* to 202*iv*, the condition may apply only to packets for a specific device or group of devices within the local network, may apply only to packets transmitted as part of a specific service, may be specific to a particular slice of the cellular communication network and/or may relate to a characteristic of the packet to be transmitted over the local network. A full discussion of these options, together with the possible nature of the condition, example characteristics etc. is provided above with reference to FIG. 3a.

As illustrated in step 204, the method may further comprise including in the configuration information sent at step 202 an override condition. Examples of override conditions are also discussed in further detail above with reference to FIG. 3a. Also as discussed in further detail above with reference to FIG. 3a, the configuration information sent at step 202 may specify an interaction between the override condition and the condition for applying the local packet replication procedure.

In step 206, the method 200 may further comprise sending, to the at least one of the gateway or a device on the local network, configuration information specifying at least one of rate of replication parameters to be applied for the local packet replication procedure and/or a condition for establishing rate of replication parameters to be applied for the local packet replication procedure. As discussed above, the rate of replication parameters and/or condition may apply to packets for transmission to a specific device or a group of devices in the local network, to packets transmitted as part of a specific service provided over the local and cellular communication networks or may be specific to a slice of the cellular communication network. The rate of replication parameters may comprise a number of copies of the packet to be included in a burst and/or a number of bursts to be transmitted and/or a timing interval between bursts.

The condition for establishing rate of replication parameters to be applied for the local packet replication procedure may comprise at least one of a Service Level Agreement (SLA) which applies to the packet, a priority of the packet, a radio interface quality in the local network, a load condition in a node performing the method, a load condition in the cellular communication network, and/or a power condition in a node performing the method. The rate of replication parameters may thus be tailored to a particular SLA, packet priority or to local or global network conditions including radio interface quality and/or processing load in a node performing the method 200 or a node performing the local packet replication procedure. As discussed in further detail above with reference to FIG. 3a, the configuration information sent at step 206 may specify an interaction between for example the one or more conditions for establishing rate of replication parameters and the condition for applying the local packet replication procedure.

In step 208, the method 200 may further comprise sending, to the at least one of the gateway or a device on the local network, configuration information specifying a time limit for application of the local packet replication procedure.

As discussed above, the method 200 may be performed by an application configured for control of the local network, which application may be hosted within the cellular communication network and for example in a core network of the cellular communication network. The application may for example be a Local Network Function and may be configured to register the gateway and the devices in the local network on the cellular communication network.

The local network may be connected to the cellular communication network via a plurality of gateways, and the method 200 may further comprise, in step 210, determining that a device in the local network is in a mobile state. The method 200 may further comprise, in step 212, causing at least some packets having that device as packet destination to be transmitted via at least two of the gateways connecting the local network to the cellular communication network. This may be achieved by replicating the packets so that at the packets are received by the gateway to which the device is currently connected and also by at least one other gateway. The additional gateway or gateways may be selected according to a trajectory of the moving device, so as to increase the probability of the packets being successfully delivered to the device. The method may further comprise causing the local packet replication procedure to be applied for the packets by the at least two gateways via which the packets are transmitted, for example by sending the configuration information specifying a condition for application of the local packet replication procedure to both gateways. According to such examples, the application performing the method 200 may have knowledge about the physical location of individual gateways, and/or information about which alternative gateways a device can reach in addition to the gateway to which the device is currently connected.

Referring still to FIG. 4, and to examples in which the local network is connected to the cellular communication network via a plurality of gateways, the method 200 may further comprise, in step 214, selecting a first set of rate of replication parameters to be applied for the local packet replication procedure performed at a first of the gateways, and in step 216, selecting a second set of rate of replication parameters to be applied for the local packet replication procedure performed at a second of the gateways. In step 220, the method 200 may comprise sending the first set of rate of replication parameters to the first gateway and sending the second set of rate of replication parameters to the second gateway. As illustrated in step 218, the first and second set of rate of replication parameters may be selected to minimise interference in the local area network. Thus, according to examples of the method 200, a controlling application may adjust burst length and burst timing for local packet replication procedures conducted in different gateways so as to minimise interference. In addition, the sending of the highest priority packets may be prioritised, for example by ensuring that no other gateway is transmitting while a particular gateway is transmitting a burst of replicated very high priority packets, or by instructing less aggressive packet replication in surrounding gateways when a particular gateway is transmitting very high priority packets, for example relating to critical network or device information.

In further examples, a controlling application conducting the method 200 may receive measurements from the gateways that it manages. The application may therefore know or estimate how much traffic is sent to each gateway and may have information about the use of relevant radio channels. The controlling application may use this information to determine rate of replication parameters including a number of copies and intervals between the copies for the different gateways it controls, and may configure the gateways with this information. In one example, if high interference is being experienced on the relevant radio channel, the controlling application may increase the number of replicated packet copies, to increase the probability of at least one copy being successfully transmitted. In the case of very bursty interference, copies may be more widely spaced to reduce the likelihood of transmitting copies during an interference peak.

As a consequence of the methods 100, 200 a receiving entity, which may be a destination device in the local network (in a DL scenario), or a gateway (in an UL scenario), may receive multiple copies of a replicated packet. If it is assumed that connectionless protocols are used for improving the latency for the packets to be duplicated, the transport protocol, such as UDP, will not detect and discard the duplicate packets. This is because there is no information in the UDP header to identify a packet so that packets can be recognised as duplicates. In such examples the application layer protocol, such as CoAP, is the place where the duplicate packets may be detected and, if a second or a further copy is detected, discarded. Should a packet subject to the local packet replication procedure be lost, this loss is far less likely to have a negative consequence for service or network performance, as the packet will have been replicated, with multiple copies of the packet being sent. It is therefore likely that at least one copy of the packet will be safely received, enabling the relevant device to continue functioning without interruption. As packets duplicated in accordance with the local packet replication procedure behave in same way as re-transmissions from the endpoint, there is no need to change application layer protocol (for example CoAP) implementation at the receiving entity to accommodate the local packet replication procedure.

In some examples, as an alternative to the duplicate detect/discard mechanism, CoAP headers may include the option of using a soft-combining feature at CoAP level for the replicated packets, for example by using a forward error correction (FEC) or similar technique for the detected replicated packets. In such examples the sender of CoAP messages may use message IDs with high amount of entropy. When replicated messages are received, the replicas are detected by inspecting the message ID. If one (or only few) of the replicas contain different bits, those bits may be assumed to be erroneous. If a replica contains a message ID that is almost identical to other messages, but not identical, the receiver can assume there is error in the message ID, owing to the high entropy in message IDs used by the sender. Using these two methods simple bit errors in transmission may be detected and easily fixed. In addition, if transport or object security is used, failure to decrypt or check signature of a message can be used as indication of transmission error. In this case a replica that works may be trusted with high confidence to not contain errors.

In other examples, as an alternative to the duplicate detect/discard mechanism, the joint CoAP ARQ mechanism may be used regardless of whether one of the replicated packets is erroneous/missing. Retransmission may thus only be triggered if the soft-combining does not work or none of the replicated packets is successfully received.

It will be appreciated that in further examples, connection-oriented protocols, such as TCP, may also be used although it is anticipated that the greatest gains in terms of latency and reliability may be expected when using connectionless protocols.

In an UL scenario, the gateway as receiving entity may forward to a destination node in the cellular network only a single one of multiple received copies of replicated packets. As the DL local packet replication procedure is conducted in the gateway, it will thus be appreciated that the local packet replication procedure may be transparent to nodes communicating with devices in the local network via the cellular communication network. It is expected that UL and DL may be asymmetric, as advanced receiving techniques such as using receiver diversity, noise/interference cancellation etc. may be used in the gateway.

Figure 5:
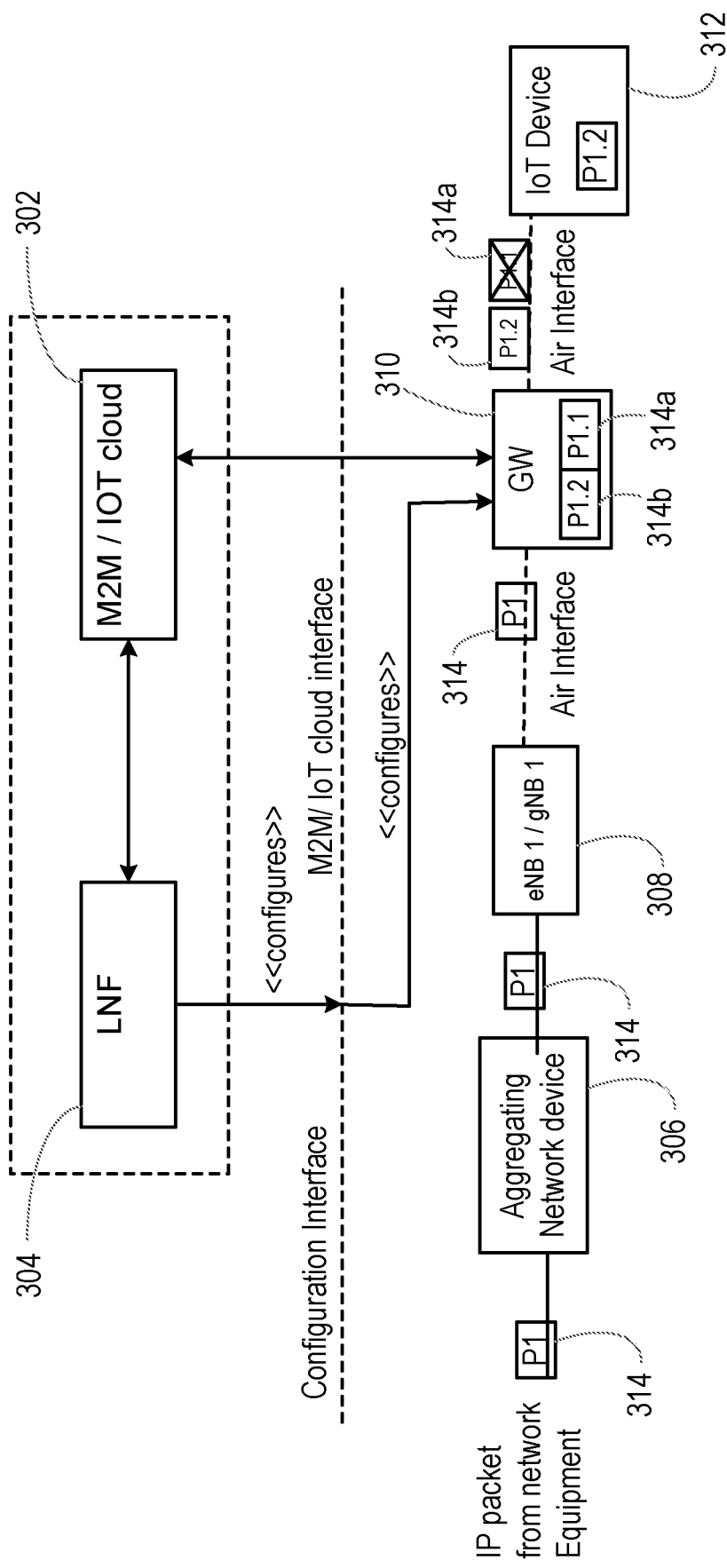
FIG. 5 is a block diagram illustrating implementation of examples of the methods of FIGS. 3a, 3b and 4.

FIG. 5 illustrates an example implementation of the methods 100, 200 in a DL scenario. Referring to FIG. 5, a Local Network Function (LNF) 304 and M2M/IoT cloud 302 are hosted within a cellular communication network. The LNF and M2M/IoT cloud configure a gateway 310 which connects a local network to the cellular communication network. The local network comprises at least one IoT device 312. The cellular communication network also comprises a network aggregating device 306 and an eNB/gNB 308, which is connected to the gateway 310 via an air interface. An example packet P1 314, destined for the IoT device 312 is received by the network aggregating device 306 and forwarded to the eNB/gNB 308, which then forwards the packet P1 314 to the gateway 310 over the air interface. The gateway 310 has been configured by the LNF with a condition for application of a local packet replication procedure and, on determining that the local packet replication procedure should be applied to packet P1 314, generates copies P1.1 314a and P1.2 314b of the packet 314. These copies are forwarded to the IoT device 312 over the local network air interface. In the illustrated example P1.1 314a is lost but P1.2 314b is successfully received by the IoT device 312, allowing the device to continue functioning without any interruption being caused by the loss of the first copy P1.1 314a.

Figure 6:
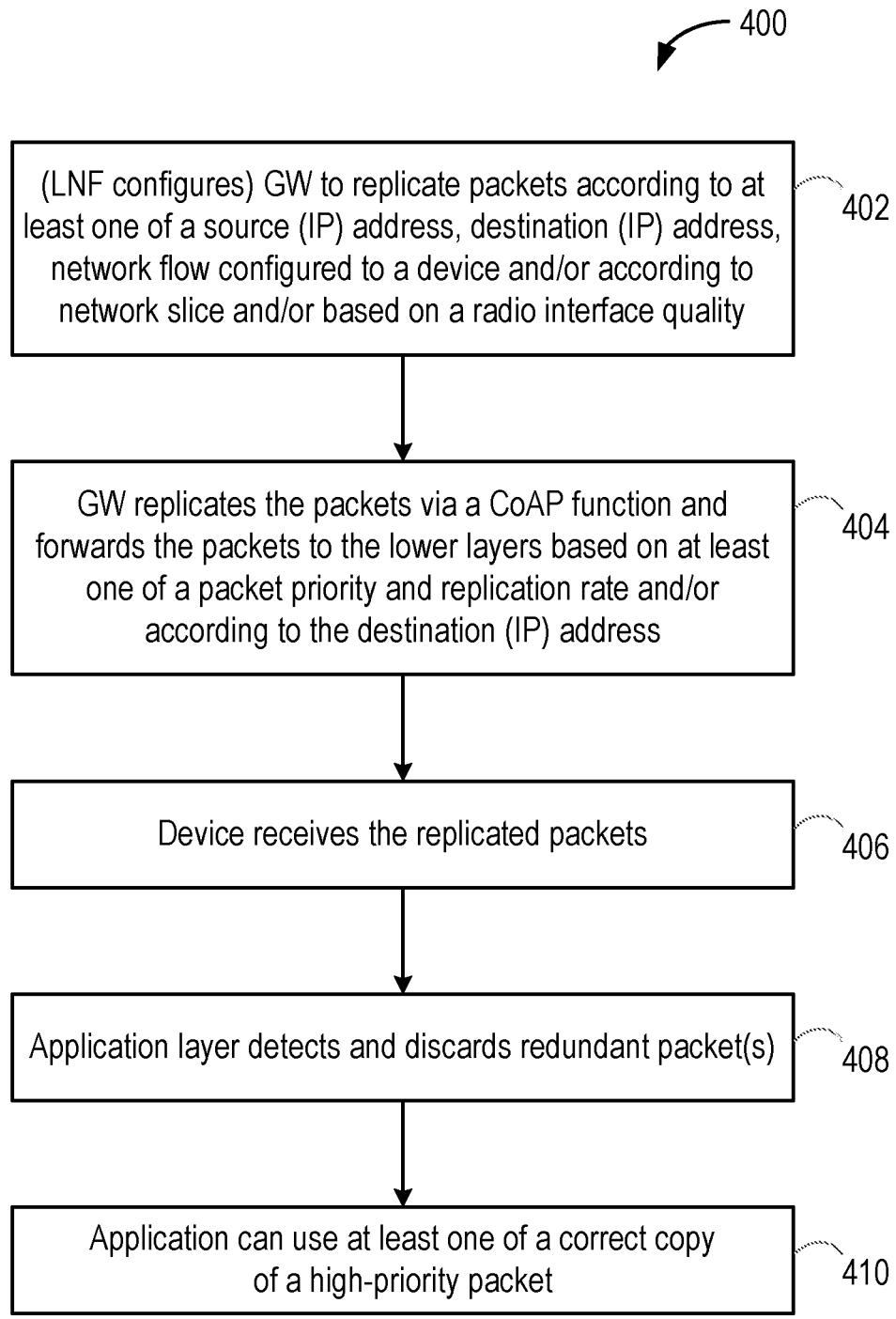
FIG. 6 is a flow chart illustrating an example implementation of methods of FIGS. 3a, 3b and 4.

The example implementation of FIG. 5 is also illustrated in FIG. 6 as a process flow 400. Referring to FIG. 6, in a first step 402 the LNF 304 configures the gateway to replicate packets according to a condition, which may specify one or more of a source (IP) address, a destination (IP) address, a network flow configured to a device, a network slice and/or radio interface quality.

In step 404, the gateway 310 replicates packets via a CoAP function and forwards the packets to lower layers based ion at least one of a packet priority and replication rate and/or according to the destination (IP) address. In step 406, the device 312 receives the replicated packets and in step 408, the application layer detects and discards redundant packets. In step 410, the application layer can use at least one of the received copies of a packet subjected to the local packet replication procedure.

Figure 7:
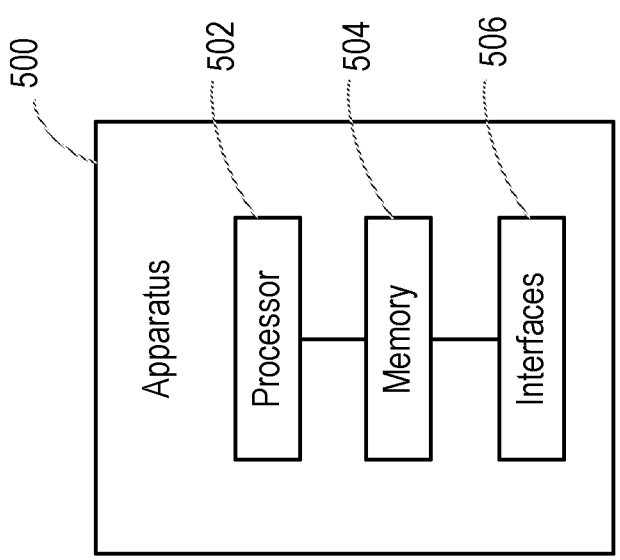
FIG. 7 is a block diagram illustrating functional units in an apparatus for performing packet communication over a local network.

As discussed above, some or all of the steps of the method 100 may be performed by a gateway connecting a local network to a cellular communication network, or by a device in the local network. FIG. 7 is a block diagram illustrating an example apparatus 500 for performing packet communication over a local network. The apparatus 500 may comprise or be comprised within a gateway connecting a local network to a cellular communication network, or a device in the local network. The apparatus 500 may implement some or all of the steps of the method 100 according to examples of the present disclosure, for example on receipt of suitable instructions from a computer program. Referring to FIG. 7, the apparatus 500 comprises a processor 502 and a memory 504. The memory 504 contains instructions executable by the processor 502 such that the apparatus 500 is operative to conduct some or all of the steps of the method 100.

Figure 8:
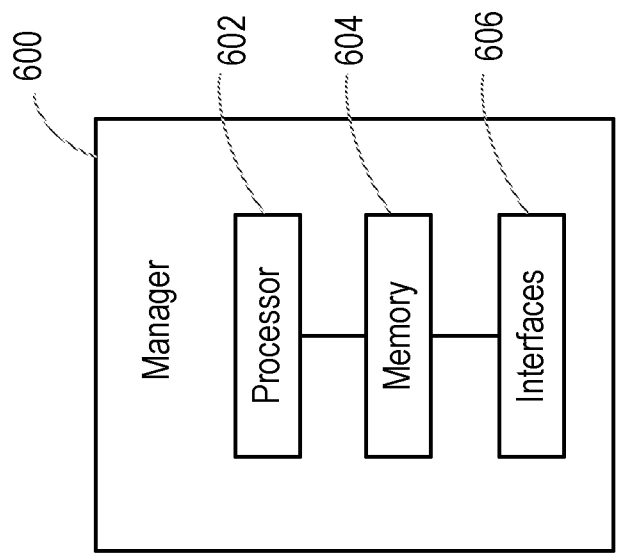
FIG. 8 is a block diagram illustrating functional units in a manager for managing packet communication over a local network.

Also as discussed above, some or all of the steps of the method 200 may be performed by an application configured for control of a local network or by a gateway connecting a local network to a cellular communication network. FIG. 8 is a block diagram illustrating an example manager 600 for managing packet communication over a local network. The manager 600 may comprise or be comprised within a gateway connecting a local network to a cellular communication network or may be an application configured for control of the local network. The manager may be a single element or may be part of a distributed management function, which may for example be a Virtualized Network Function. In the case of an application configured for control of the local network, the application may be hosted within the cellular communication network, for example within the core network of the cellular communication network, and may be configured to register the gateway and the devices in the local network on the cellular communication network. The manager 600 may implement some or all of the steps of the method 200 according to examples of the present disclosure, for example on receipt of suitable instructions from a computer program. Referring to FIG. 8, the manager 600 comprises a processor 602 and a memory 604. The memory 604 contains instructions executable by the processor 602 such that the apparatus 600 is operative to conduct some or all of the steps of the method 200.

Figure 9:
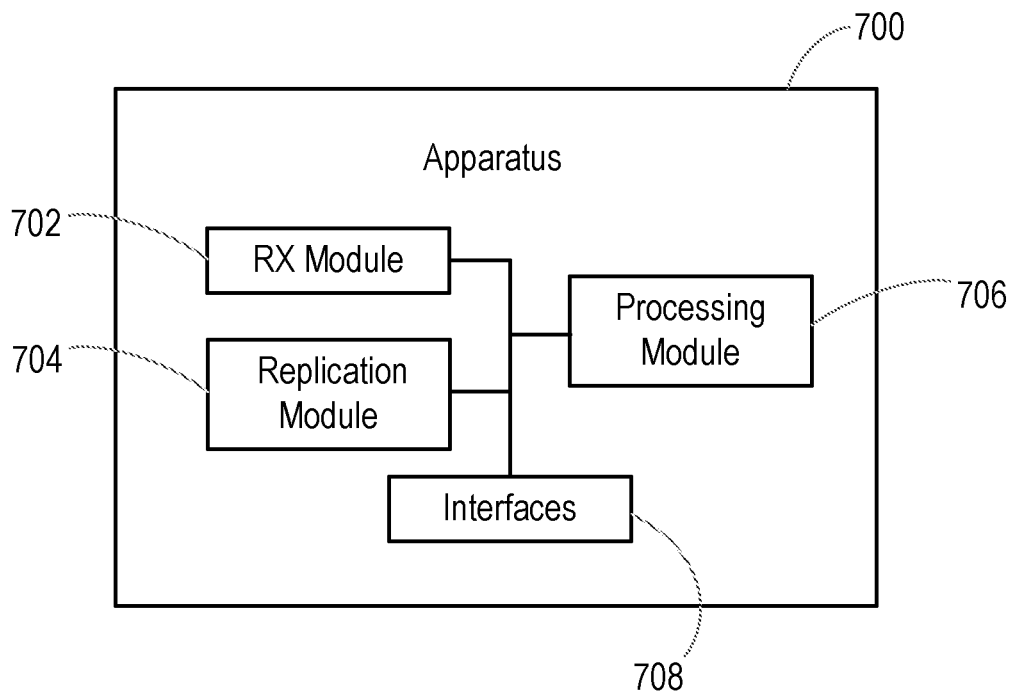
FIG. 9 is a block diagram illustrating functional units in another example of apparatus for performing packet communication over a local network.

FIG. 9 illustrates functional units in another example of apparatus 700 which may execute some or all of the steps of the method 100 according to examples of the present disclosure, for example according to computer readable instructions received from a computer program. It will be understood that the units illustrated in FIG. 9 are functional units, and may be realised in any appropriate combination of hardware and/or software. The units may comprise one or more processors and may be integrated to any degree.

Referring to FIG. 9, the apparatus 700 comprises a receiving module 702 for receiving configuration information specifying a condition for application of a local packet replication procedure. The apparatus 700 also comprises a processing module 706 for determining if the condition is satisfied for a packet to be transmitted over the local network, a replication module 704 for applying the local packet replication procedure to the packet to be transported over the local network if it is determined that the condition is satisfied for the packet, and interfaces 708. The local packet replication procedure comprises generating a copy of the packet for transmission to the packet destination and is performed at an application layer protocol.

Figure 10:
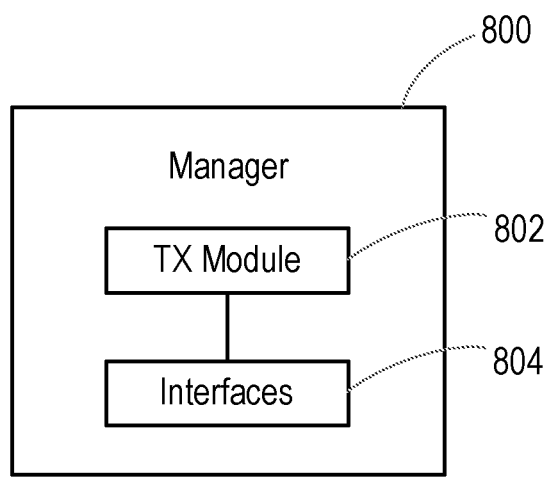
FIG. 10 is a block diagram illustrating functional units in another example of manager for managing packet communication over a local network.

FIG. 10 illustrates functional units in another example of manager 800 which may execute some or all of the steps of the method 200 according to examples of the present disclosure, for example according to computer readable instructions received from a computer program. It will be understood that the units illustrated in FIG. 10 are functional units, and may be realised in any appropriate combination of hardware and/or software. The units may comprise one or more processors and may be integrated to any degree.

Referring to FIG. 10, the manager 800 comprises a transmission module 802 for sending, to at least one of the gateway or a device on the local network, configuration information specifying a condition for application of a local packet replication procedure by the gateway or a device on the local network. The local packet replication procedure comprises generating a copy of the packet for transmission to the packet destination and is performed at an application layer protocol. The manager 800 also comprises interfaces 804.

Aspects of the present disclosure thus provide methods of performing and managing packet communication over a local network according to which a local packet replication procedure may be conducted for a particular packet to be transported over the local network, if a condition for application of the local packet replication procedure is satisfied by the packet. The local network is connected to a cellular communication network by a gateway. Communication between the gateway and devices in the local network may be based on SRR protocols in lower layers and on (IP), UDP and an application protocol such as CoAP in the higher layers. A local network function, located in the cellular communication network, may control the gateway, which may be an LTE or 5G UE from the cellular network point of view.

The local packet replication procedure according to aspects of the present disclosure is performed above the radio protocols, more specifically by an application layer protocol such as CoAP. The condition for application of the local packet replication procedure may ensure that the procedure is applied only to those packets requiring higher reliability. The condition may specify one or more characteristics of a packet to be taken into account, for example a source and/or destination (IP) address, an IoT device ID or a MAC ID; a network slice ID, a flow configured for the gateway in the cellular communication network domain, a priority of the packet etc. In some examples, the condition for application of the local packet replication procedure and rate of replication parameters may be adjusted according to at least one of a service level agreement, a local network radio link quality indicator or other factors including load conditions and battery power. Replication detection and combining/duplicate-discarding may be performed by an application layer function at the receiver side. In some examples, multiple gateways may be configured to transmit and/or replicate high-priority packets to a mobile device in the local network, in order to minimise packet losses.

Advantages offered by examples of the present disclosure include increased transmission reliability for those packets for which such reliability is most important. This increase in transmission reliability does not come at a cost of increased latency or inefficient resource usage, as may be the case in end to end packet replication procedures. The trade-off between the latency gain of connectionless protocols (e.g., UDP) and the reliability gain of connection oriented protocols is thus avoided. As the packet replication procedure of the present disclosure is local, the sending of multiple copies of a packet over a cellular communication network air interface is avoided.

It will be appreciated that a change in the radio protocol stack for packet replication is not required, as the application layer can handle the packet replication process and legacy devices can be used. Radio processing is also reduced. Examples of the present disclosure provide methods which may adapt to characteristics across the protocol stack, including features of the local network and information in the application layer protocol headers. Examples of the present disclosure may minimise packet losses for mobile IoT devices by enabling multiple gateways to repeat packets requiring high reliability.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for performing packet communication over a local network connected to a cellular communication network via a gateway, the method comprising:
receiving first configuration information specifying a condition for application of a local packet replication procedure;
determining if the condition is satisfied for a packet to be transmitted over the local network; and
applying the local packet replication procedure to the packet to be transported over the local network when the condition is determined to be satisfied for the packet,
wherein the local packet replication procedure comprises generating a copy of the packet for transmission to the packet destination, and
wherein the local packet replication procedure is performed at an application layer protocol; and wherein determining when the condition is satisfied for the packet to be transmitted over the local network includes inspecting at least one of:
an application layer header of the packet; and
DiffServ code points for the packet.

2. The method of claim 1, wherein the condition applies to one or more of:
packets for transmission to a specific device or a group of devices in the local network, and
packets transmitted as part of a specific service provided over the local network and the cellular communication network.

3. The method of claim 1, wherein the condition is specific to a slice of the cellular communication network.

4. The method of claim 1, wherein the condition relates to a characteristic of the packet to be transported over the local network including one or more of:
an origin of the packet;
a destination of the packet;
a network flow of which the packet is a part; and
a priority of the packet.

5. The method of claim 1, further comprising:
checking for an override condition; and
if the override condition is satisfied, ceasing to apply the local packet replication procedure to the packet,
wherein the override condition comprises at least one of the following:
a threshold load condition in a first node performing the method;
a threshold load condition in the cellular communication network;
a threshold power condition in a second node performing the method; and
a threshold radio interface quality in the local network.

6. The method of claim 1, further comprising receiving second configuration information specifying at least one of the following:
rate of replication parameters to be applied for the local packet replication procedure;
a condition for establishing rate of replication parameters to be applied for the local packet replication procedure, wherein the condition comprises at least one of the following:
a Service Level Agreement which applies to the packet;
a priority of the packet;
a radio interface quality in the local network;
a load condition in a first node performing the method;
a load condition in the cellular communication network; and
a power condition in a second node performing the method.

7. The method of claim 1, further comprising:
receiving second configuration information specifying a time limit for application of the local packet replication procedure; and
ceasing application of the local packet replication procedure on expiry of the time limit.

8. The method of claim 7, further comprising during application of the local packet replication procedure, adjusting a rate of replication parameter as a function of time remaining until expiry of the time limit.

9. The method of claim 1, wherein one of the following sets of conditions is true:
the method is performed by the gateway connecting the local network to the cellular communication network, and the first configuration information is received from an application configured for control of the local network; or
the method is performed by a device in the local network, and the first configuration information is received from the gateway connecting the local network to the cellular communication network.

10. A method for managing packet communication over a local network connected to a cellular communication network via a plurality of gateways, the method comprising:
sending, to at least one of the gateway or a device on the local network, first configuration information specifying a condition for application of a local packet replication procedure by the gateway or the device on the local network;
wherein the local packet replication procedure comprises generating a copy of a packet for transmission to a packet destination, and
wherein the local packet replication procedure is performed at an application layer protocol;
wherein the condition is associated with characteristics of at least one of the following:
an application layer header of the packet, and DiffServ code points for the packet.

11. The method of claim 10, wherein the condition applies to one or more of:
packets for transmission to a specific device or a group of devices in the local network, and
packets transmitted as part of a specific service provided over the local network and the cellular communication network.

12. The method of claim 10, wherein the condition is specific to a slice of the cellular communication network.

13. The method of claim 10, wherein the condition relates to a characteristic of the packet to be transported over the local network including at least one of:
an origin of the packet;
a destination of the packet;
a network flow of which the packet is a part; and
a priority of the packet.

14. The method of claim 10, wherein the first configuration information further specifies an override condition for ceasing application of the local packet replication procedure.

15. The method of claim 10, further comprising sending, to the at least one of the gateway or a device on the local network, second configuration information specifying at least one of the following:
a time limit for application of the local packet replication procedure;
rate of replication parameters to be applied for the local packet replication procedure; and
a condition for establishing rate of replication parameters to be applied for the local packet replication procedure, wherein the condition comprises at least one of the following:
a Service Level Agreement which applies to the packet;
a priority of the packet;
a radio interface quality in the local network;
a load condition in a first node performing the method;
a load condition in the cellular communication network;
a power condition in a second node performing the method.

16. The method of claim 10, wherein:
the method is performed by an application configured for control of the local network;

the local network is connected to the cellular communication network via a plurality of gateways; and
the method further comprises:
determining that a device in the local network is in a mobile state; and
causing at least some packets having that device as packet destination to be transmitted via a at least two of the gateways connecting the local network to the cellular communication network.

17. The method of claim 10, wherein:
the method is performed by an application configured for control of the local network;
the local network is connected to the cellular communication network via a plurality of gateways; and
the method further comprises:
selecting a first set of rate of replication parameters to be applied for the local packet replication procedure performed at a first of the gateways;
selecting a second set of rate of replication parameters to be applied for the local packet replication procedure performed at a second of the gateways;
sending the first set of rate of replication parameters to the first gateway; and
sending the second set of rate of replication parameters to the second gateway,
wherein the first and second set of rate of replication parameters are selected to minimize interference in the local area network.

18. An apparatus for performing packet communication over a local network connected to a cellular communication network via a gateway, the apparatus comprising:
a processor; and
a memory containing instructions executable by the processor whereby the apparatus is configured to:
receive configuration information specifying a condition for application of a local packet replication procedure;
determine if the condition is satisfied for a packet to be transmitted over the local network; and
apply the local packet replication procedure to the packet to be transported over the local network when the condition is determined to be satisfied for the packet,
wherein the local packet replication procedure comprises generating a copy of the packet for transmission to the packet destination, and
wherein the local packet replication procedure is performed at an application layer protocol; and
wherein the apparatus is configured to determine when the condition is satisfied for the packet to be transmitted over the local network based on inspecting at least one of:
an application layer header of the packet; and
DiffServ code points for the packet.

19. An apparatus for managing packet communication over a local network connected to a cellular communication network via a plurality of gateways, the apparatus comprising:
a processor; and
a memory containing instructions executable by the processor whereby the apparatus is configured to:
send, to at least one of the gateway or a device on the local network, configuration information specifying a condition for application of a local packet replication procedure by the gateway or the device on the local network;
wherein the local packet replication procedure comprises generating a copy of a packet for transmission to a packet destination, and
wherein the local packet replication procedure is performed at an application layer protocol;
wherein the condition is associated with characteristics of at least one of the following:
an application layer header of the packet, and DiffServ code points for the packet.

* * * * *